United States Patent [19]

Hendricks

[11] Patent Number: 4,570,758
[45] Date of Patent: Feb. 18, 1986

[54] MANUAL CONTROL FOR RELEASABLY HOLDING A SPRING APPLIED/ELECTRICALLY RELEASED BRAKE DISENGAGED

[75] Inventor: Wayne D. Hendricks, Mukwonago, Wis.

[73] Assignee: Wehr Corporation, Milwaukee, Wis.

[21] Appl. No.: 505,878

[22] Filed: Jun. 20, 1983

[51] Int. Cl.⁴ .............................................. B60T 13/04
[52] U.S. Cl. .................................... 188/72.3; 188/171
[58] Field of Search ............... 188/171, 173, 163, 166, 188/167, 170, 216, 72.3, 72.6, 72.9; 192/90, 89 A; 310/77, 93; 318/372; 74/99 R, 96, 503

[56] References Cited

U.S. PATENT DOCUMENTS

| | | | |
|---|---|---|---|
| 2,059,244 | 12/1936 | Kiekhaefer | 188/171 |
| 2,620,901 | 12/1952 | Stearns | 188/171 |
| 3,045,782 | 7/1962 | Hansen | 188/171 |
| 3,095,068 | 6/1963 | Hansen | 188/171 |
| 3,525,424 | 8/1970 | McCarthy | 188/171 |
| 3,812,936 | 5/1974 | Dane | 188/171 |

Primary Examiner—Bruce H. Stoner, Jr.
Assistant Examiner—Alvin Oberley

[57] ABSTRACT

The compressed spring acting on one end of the lever urges the lever in the direction to apply force to a pressure plate guided by the fixed bushings to apply pressure to the brake pads and discs to prevent rotation of a motor shaft received in the coupling. When the solenoid coil is energized, the armature lifts the end of the lever to relieve the pressure and release the brake. If the plunger at the other end of the lever is depressed, the lever will tilt to release the brake and the brake will remain released as long as the plunger is depressed. The same spring which biases the plunger upwardly biases the plunger in a rotational sense so the plunger can be rotated against the bias of the spring and cause the projecting pin to work against the cam on the end of the lever to tilt the lever in the direction allowing the brake to release. If the pin passes over the hump on the cam, the brake will remain released until the plunger is manually returned to its original position or until the coil is energized long enough to lift the other end of the lever and permit the projecting pin to pass over the cam hump and return to its original position.

24 Claims, 5 Drawing Figures

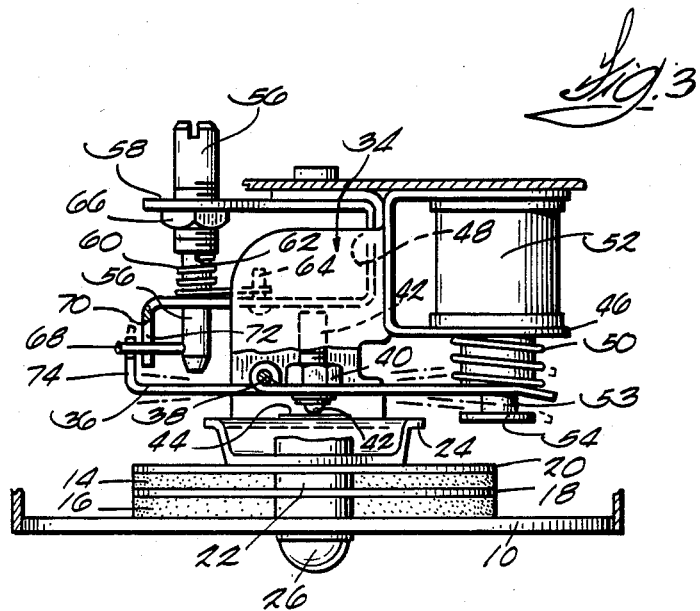
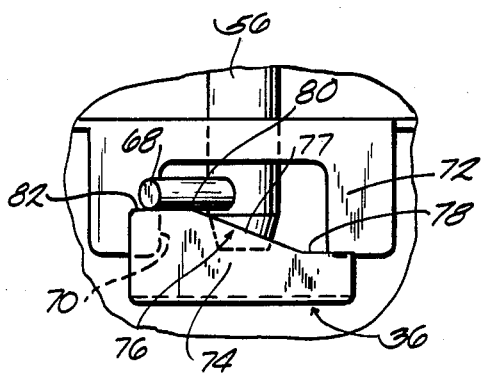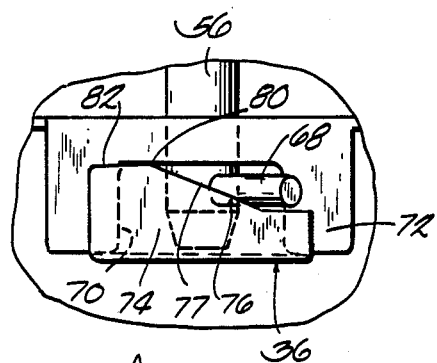

MANUAL CONTROL FOR RELEASABLY HOLDING A SPRING APPLIED/ELECTRICALLY RELEASED BRAKE DISENGAGED

BACKGROUND OF THE INVENTION

Electric motors are frequently provided with brakes to stop the motor rapidly when the motor is de-energized and/or under emergency conditions. There are various types of arrangements for setting and releasing brakes. For example, a solenoid or the like can be energized to release the brakes when the motor is energized. The brakes are spring loaded to the set position so they set automatically when the motor and solenoid are de-energized.

Another way to operate the brakes is to have the brakes biased to the "set" position and manually actuated to the released position. The manual actuation can be a deadman control in which the operator's hand must keep the brake in the released position and the brakes will immediately set on release of the hand pressure.

Another type of manual control is one in which the control can be latched in a brake released position until the control is manually returned to the "set" position or will return automatically when a solenoid is energized.

No single construction permitted use in all the various modes. The designs were for specific uses and this required the motor manufacturer to carry a larger inventory and unit costs were necessarily high.

SUMMARY OF THE INVENTION

The principal object of this invention is to provide brake setting and release arrangements in which the brakes can be controlled by an electric control, a deadman control, a control permitting the brakes to be latched in the released position for subsequent setting by manual return of the control or return by reason of operation of the electric control.

Another object of this invention is to provide for a deadman control and a manual latching brake control both operated by the same actuating mechanism.

A further object of this invention is to provide a plunger which may be moved axially against a spring bias to provide for a deadman control for release of the brakes or can be rotated against the bias of the spring and latched in a brake released position with the latch being released manually or by electrical means.

BRIEF DESCRIPTION OF THE DRAWINGS

FIG. 3 is a vertical elevation from the left in FIG. 1.
FIGS. 4 and 5 are fragmentary elevations showing the cam/latch arrangement.

DETAILED DESCRIPTION OF THE DRAWINGS

Figure 1:
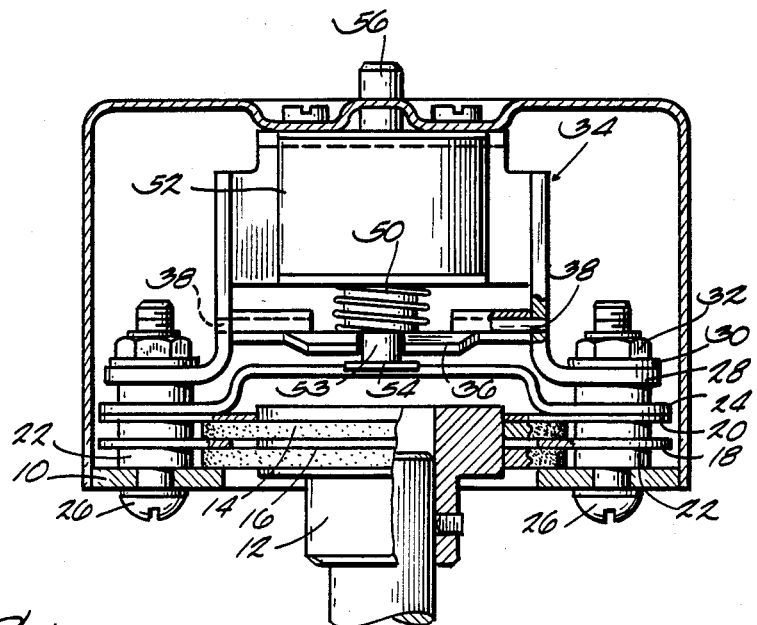
FIG. 1 is a vertical elevation with the cover sectioned to show the interior and with some parts broken away.
Figure 2:
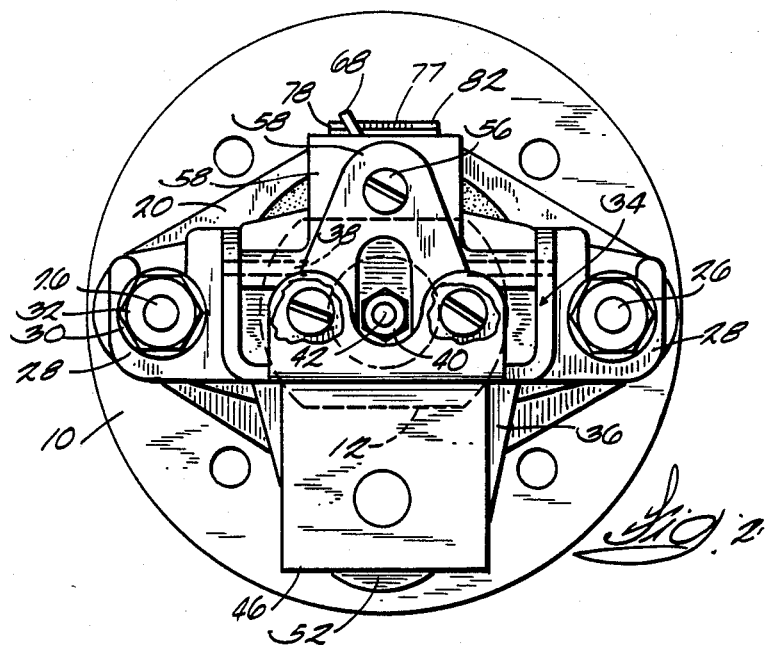
FIG. 2 is a top plan view with the cover removed.

The mounting ring 10 is adapted to be secured to the end bell of an electric motor with the motor shaft projecting into connector 12 which has opposed flats on the exterior thereof engaging cooperating apertures in the rotating friction brake pads 14, 16. The perimeter of brake pad 14 lies between mounting ring 10 and the non-rotating disc 18 while the perimeter of pad 16 lies between disc 18 and the non-rotating disc 20. The discs 18 and 20 are axially movable along sleeve 22 which acts as a bushing for the discs and for pressure plate 24.

The sleeve fits over the threads of bolt 26 and the outwardly turned mounting ears 28 engage the bolts (to the left of the sleeve in the drawing) while washer 30 and nut 32 serve to hold the mounting ears in position to support the bracket 34. Bracket 34 has a U-shaped configuration in plan view with the legs of the U serving to support the lever 36 on drift pins 38, 38 which serve as pivots for the lever, the drift pins being received in the turned over portions of the lever forming sleeves for the pins.

Lever 36 has an internally threaded bolt 40 threaded into the lever and receiving the adjustable pin 42. The lower end of the pin 42 acts on the central boss 44 of the pressure plate 24. Thus, if the right hand end of the lever 36 is moved downwardly, pin 42 acts against the boss 44 to move the pressure plate to compress the discs and friction pads and set the brake.

The coil frame 46 is secured to the bracket 34 by screws 48 and spring 50 compressed between the underside of the coil frame 46 and the top of the lever urges the right hand end of the lever downwardly to set the brake. Coil 52 has an armature inside the compressed spring 50. The lower end of the armature has a reduced diameter portion 53 and an enlarged head 54. The reduced diameter portion receives the slotted end of the lever 36 while the enlarged head lies under the lever and bridges the slot. When the coil is energized, head 54 will engage and lift the lever to the upper position illustrated. This relieves pressure on the pressure plate and releases the brake.

The lever 36 can also be made to pivot in opposition to the force of compressed spring 50 by actuation of the manual plunger 56. Plunger 56 is mounted in aligned holes in the upper and lower legs of support 58 which is fixed to the bracket 34. The upper end of spring 60 is received in a hole 62 in the plunger and the lower end seats against the upper surface of the lower leg of the support 58 with the end of the spring being wrapped around post (screw) 64 so that the spring 60 not only urges the plunger upwardly but also counterclockwise when viewed from above. Engagement of the nut 66 with the underside of the upper leg of the support 58 determines the upper limit of travel of the plunger. The lower end of the plunger has a pin 68 projecting beyond the aperture 70 in the skirt 72 depending from the front of the lower leg of the support 58. Thus, engagement of the pin 68 with the sides of the aperture 70 determines the limit of rotational movement of the pin and plunger. The spring biases the pin to engage the right hand edge of the aperture as seen in FIG. 5.

The free end of the pin 68 overlies the turned up end 74 of lever 36. This end is shaped to provide a cam surface 76 which includes a portion 77 rising from the lower surface 78 to peak 80 and then a slightly falling portion 82 beyond the peak. As the plunger is rotated from its normal position it first engages the portion 77 causing the lever to tilt about its pivot 38 and release the brake. When the pin goes past the peak 80 it rests against the slight down slope 82. There is enough friction to keep the pin on the down slope 82 of cam 76. The plunger can be manually rotated back over the hump 80, or, if left in the brake released position, it can be allowed to return under the influence of the return spring if the solenoid coil 52 is energized to cause the right hand end of the lever to lift slightly and let the pin clear the peak 80 and then return to its normal position.

With this arrangement, it will be seen the operating lever 36 is biased to set the brake. The brake can be released in various ways. The solenoid can be energized to tilt the lever 36 about its pivot 38 in the counterclockwise direction and relieve pressure on the pressure plate. The solenoid can be wired in circuit with the motor so de-energization of the motor will automatically de-energize the coil and let the spring 50 move the lever 36 clockwise to set the brake. Or the brake can be released with the deadman control by depressing the plunger 56. The brake will remain released only so long as the plunger is depressed. Still another way to operate the brake is to rotate the plunger 56 to the latched position in which the brake is released and will remain released until the plunger returns to its normal position. The return can be through manual actuation or will return automatically when the solenoid is energized. Momentary actuation of the solenoid causes lever 36 to tilt a small amount releasing the pin 68 from frictional engagement with the cam surface and allowing the plunger to return to normal. Other possibilities will no doubt occur to the designer or user. The important fact is that the present arrangement provides for a considerable variety in actuating modes with a simple structure. Furthermore, it is not believed that any brake set and release mechanism has afforded the deadman control and the rotate-to-latch type of control operating with the same plunger.

I claim:

1. A brake and brake release comprising
   a frame including fixed bushings parallel to the axis of the frame,
   a brake disc mounted on said bushings for axial movement,
   a rotating brake pad engageable with the disc,
   a drive hub having a driving engagement with said pad and being adapted to be driven,
   a pressure plate mounted on the bushings for movement between a "brake set" position in which the disc and pad frictionally engage and stop rotation of the pad and hub and a "brake released" position in which the disc and pad are not frictionally engaged and the hub and pad rotate freely,
   a lever pivotally mounted on the frame and having an actuator engageable with said pressure plate,
   a lever spring biasing the lever to move the pressure plate to said "brake set" position,
   a manual control for moving the lever to an operative position against the bias of said lever spring to allow the pressure plate to move to the "brake released" position, said manual control including a plunger which is axially moveable from a brake set position to a first brake released position, and which is rotationally moveable from said brake set position to a second brake released position, said manual control also including a plunger spring biasing said plunger axially and rotationally to said brake set position, and said manual control further including cam means effective between said plunger and said lever to actuate said lever to said operative position when said plunger is rotated to said second brake released position, said cam means including a shaped portion,
   means for retaining said manual control in said operative position, said retaining means including latch means including said shaped portion,
   electrically operated means for moving said lever to said operative position, actuation of said electrically operated means when said plunger is in said brake released position being operative to release said plunger from said latch means, said electrically operated means including a solenoid having a fixed coil and an armature which engages said lever when said coil is energized, said lever spring being compressed between said coil and said lever and being coaxial with said armature, and
   means for releasing said manual control from said operative position, said releasing means including manual means for releasing said manual control, and said electrically operated means.

2. A brake and brake release comprising, friction brake means, a pressure plate for moving the friction brake means into operative position when pressure is applied to the plate, a lever associated with the pressure plate, spring means biasing the lever to apply brake setting pressure to the plate, a manually operable plunger biased to a first position and axially moveable to a second position in which it acts on said lever in opposition to said lever spring to relieve pressure from said plate and permit the brake to release, said plunger also being rotatable from said first position to a third position, cam means responsive to plunger rotation from the first to third positions to act on said lever in opposition to said lever spring to release pressure on said plate and permit the brake to release, said cam means acting between said plunger and said lever to retain said plunger in said third position, and solenoid means acting on said lever in opposition to the lever spring to move the lever to a position in which pressure on the plate is relieved and the brake is released.

3. A brake and brake release according to claim 2 including a spring acting on said plunger to bias it to said first position from either the second or third position.

4. A brake and brake release according to claim 3 in which energization of the solenoid is operative to release said plunger for movement from the third position to the first position.

5. A brake apparatus comprising
   a frame,
   braking means including a brake mounted on said frame, and a lever pivotally mounted on said frame and being engageable with said brake, said lever being selectively and alternatively movable between a set position wherein said brake is set, and a release position wherein said brake is released,
   a lever spring biasing said lever to said set position,
   a plunger having axial and rotational modes of movement and wherein in one mode of movement said plunger is operable as deadman means to hold said lever in said release position so long as force is maintained on said plunger, and in the other mode of movement said plunger is operable as latch means to hold said lever in said release position in response to said other mode of movement and to hold said lever in said release position after the force thereon is removed, and
   means for releasing said plunger from said lever so that said lever returns to said set position.

6. A brake apparatus as set forth in claim 5 and further comprising electrically operated means for moving said lever to said release position.

7. A brake apparatus as set forth in claim 6 wherein said electrically operated means includes a solenoid having a fixed coil and an armature which engages said lever so as to move said lever to said release position when said coil is energized, and wherein said lever spring is compressed between said coil and said lever and is coaxial with said armature.

8. A brake apparatus comprising a frame, braking means including a brake mounted on said frame, and a lever pivotally mounted on said frame and being engageable with said brake, said lever being selectively and alternatively movable between a set position wherein said brake is set, and a release position wherein said brake is released, a lever spring biasing said lever to said set position, manual release means having two different modes of movement and wherein in one mode of movement said release means is operable as deadman means to hold said lever in said release position so long as force is maintained on said release means, and in the other mode of movement said release means is operable as latch means to hold said lever in said release position in response to said other mode of movement and to hold said lever in said release position after the force thereon is removed, said manual release means including a plunger which is axially moveable in said one mode of movement between a set position wherein said lever is in said set position, and a first release position wherein said lever is in said release position, said plunger also being rotatable in said other mode of movement between said set position and a second release position wherein said lever is in said release position, and means for releasing said plunger from said second release position so that said lever returns to said set position.

9. A brake apparatus as set forth in claim 8 wherein actuation of said electrically operated means releases said plunger from said second release position, and wherein said means for releasing said latch means further includes manual means for releasing said latch means independently of said electrically operated means.

10. A brake apparatus as set forth in claim 8 and further including a plunger spring biasing said plunger axially and rotationally to said set position.

11. A brake apparatus as set forth in claim 10 including cam means effective between said plunger and said lever to move said lever to said release position when said plunger is rotated to said second release position.

12. A brake apparatus as set forth in claim 11 wherein said latch means includes a shaped portion of said cam means for latching said plunger in said second release position.

13. A brake apparatus as set forth in claim 12 and further comprising electrically operated means for moving said lever to said release position.

14. A brake apparatus as set forth in claim 13 wherein actuation of said electrically operated means when said plunger is latched in said second release position is operative to release said plunger from said second release position.

15. A brake apparatus as set forth in claim 11 wherein said plunger includes a lower end, and wherein said cam means includes a turned up portion of said lever including an upper edge forming a cam surface, said cam surface including a lower surface, a sloped portion rising from said lower surface toward a peak, and a slightly falling portion beyond said peak, said cam means also including a projection extending from said plunger adjacent said lower end, said projection engaging said sloped portion of said cam surface when said plunger is rotated from said set position to said second release position so as to move said lever to said release position.

16. A brake apparatus as set forth in claim 15 wherein said latch means includes said slightly falling portion of said cam surface, and wherein said projection passes over said peak to said slightly falling portion as said plunger is rotated to said second release position and is retained on said slightly falling portion by said peak so that said plunger is retained in said second release position.

17. A brake apparatus as set forth in claim 14 and further comprising electrically operated means for moving said lever to said release position.

18. A brake apparatus as set forth in claim 17 wherein actuation of said electrically operated means when said plunger is retained in said second release position is operative to pivot said lever such that said projection is allowed to pass over said peak such that said plunger returns to said set position under the influence of said plunger spring.

19. A brake apparatus as set forth in claim 18 wherein said frame includes means for limiting horizontal movement of said plunger projection, thereby limiting rotational movement of said plunger.

20. A brake apparatus comprising a frame braking means including a brake mounted on said frame, and a lever pivotally mounted on said frame and being engageable with said brake, said lever being selectively and alternatively movable between a set position wherein said brake is set, and a release position wherein said brake is released, a lever spring biasing said lever to said set position, and manual release means selectively and alternatively operable as deadman means and as latch means for holding said lever in said release position against the bias of said spring, said manual release means including a plunger having a lower end and being axially movable between a set position wherein said lever is in said set position and a first release position wherein said lever is in said release position, said plunger also being rotatable between said set position and a second release position wherein said lever is in said release position, a plunger spring biasing said plunger axially and rotationally to said set position, and cam means effective between said plunger and said lever to move said lever to said release position when said plunger is rotated to said second release position, said cam means including a turned up portion of said lever including an upper edge forming a cam surface, said cam surface including a lower surface, a sloped portion rising from said lower surface toward a peak, and a slightly falling portion beyond said peak, said cam means also including a projection extending from said plunger adjacent said lower end, said projection engaging said sloped portion of said cam surface when said plunger is rotated from said set position to said second release position so as to move said lever to said release position.

21. A brake apparatus as set forth in claim 20 wherein said latch means includes said slightly falling portion of said cam surface, and wherein said projection passes over said peak to said slightly falling portion as said plunger is rotated to said second release position and is retained on said slightly falling portion by said peak so that said plunger is retained in said second release position.

22. A brake apparatus as set forth in claim 21 and further comprising electrically operated means for moving said lever to said release position.

23. A brake apparatus as set forth in claim 22 wherein actuation of said electrically operated means when said plunger is retained in said second release position is operative to pivot said lever such that said projection is allowed to pass over said peak such that said plunger returns to said set position under the influence of said plunger spring.

24. A brake apparatus as set forth in claim 23 wherein said frame includes means for limiting horizontal movement of said plunger projection, thereby limiting rotational movement of said plunger.

* * * * *

UNITED STATES PATENT AND TRADEMARK OFFICE
CERTIFICATE OF CORRECTION

PATENT NO. : 4,570,758
DATED : February 18, 1986
INVENTOR(S) : Wayne D. Hendricks It is certified that error appears in the above-identified patent and that said Letters Patent is hereby corrected as shown below:

Claim 17, column 6, line 14, "claim 14" should be --claim 16--.

Signed and Sealed this

Tenth Day of June 1986

[SEAL]

Attest:

DONALD J. QUIGG

Attesting Officer

Commissioner of Patents and Trademarks